United States Patent [19]
Ikeda et al.

[11] Patent Number: 6,014,498
[45] Date of Patent: Jan. 11, 2000

[54] DEVICE FOR HEATING FLUID CONTROL APPARATUS

[75] Inventors: Nobukazu Ikeda; Keiji Hirao; Yuji Kawano; Masayuki Hatano; Yukio Minami; Hiroshi Morokoshi, all of Osaka, Japan

[73] Assignee: Fujikin Incorporated, Osaka, Japan

[21] Appl. No.: 09/035,345

[22] Filed: Mar. 5, 1998

[30] Foreign Application Priority Data

Mar. 7, 1997 [JP] Japan ..................................... 9-052608

[51] Int. Cl.[7] .................................. F24H 1/10; H05B 3/06
[52] U.S. Cl. ........................ 392/479; 219/528; 219/535; 219/520
[58] Field of Search ..................................... 392/479, 480; 219/520, 528, 535, 536; 248/685, 688, 649, 674–76, 680, 65–72, 205.1, 220, 298.1; 137/2, 12, 341, 334, 625, 625.64, 613

[56] References Cited

U.S. PATENT DOCUMENTS

| | | | |
|---|---|---|---|
| 3,733,459 | 5/1973 | Lengstorf | 219/201 |
| 3,975,617 | 8/1976 | Othmer | 219/300 |
| 4,372,197 | 2/1983 | Augsburger | 454/272 |
| 4,792,659 | 12/1988 | Thomas | 219/201 |

FOREIGN PATENT DOCUMENTS

| | | |
|---|---|---|
| 0 802 363 | 10/1997 | European Pat. Off. . |
| 04 064788 | 2/1992 | Japan . |
| 2 156 191 | 10/1985 | United Kingdom . |

Primary Examiner—Mark Paschall
Assistant Examiner—Thor S Campbell
Attorney, Agent, or Firm—Armstrong, Westerman, Hattori, McLeland & Naughton

[57] ABSTRACT

A device for heating a fluid control apparatus comprises a tape heater disposed on at least one of opposite lateral sides of the fluid control apparatus, and a plurality of brackets each comprising a bottom wall fastened to a panel with a screw and at least one side wall for holding the tape heater in contact with a fluid controller. The bottom wall of each of the brackets is formed with a screw hole, and each bracket is attached to the panel and adjustable in position.

6 Claims, 3 Drawing Sheets

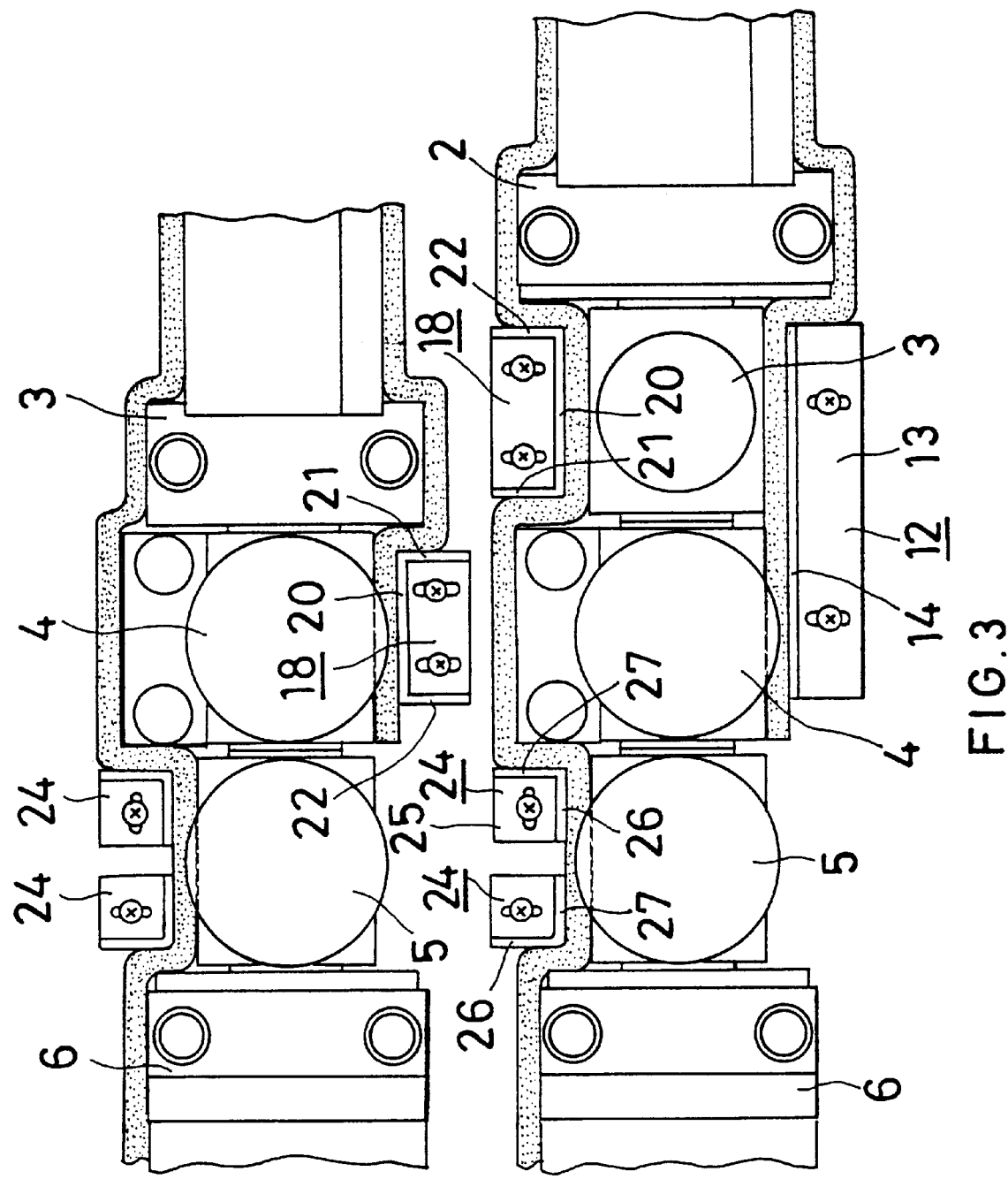

DEVICE FOR HEATING FLUID CONTROL APPARATUS

BACKGROUND OF THE INVENTION

The present invention relates to heating devices to be installed in fluid control apparatus comprising a massflow controller, on-off valves, etc., for example, for preventing condensation and for preventing the re-liquefaction of a gas as converted from a fluid which is in the form of a liquid at room temperature.

For use in fluid control apparatus which comprise a massflow controller, on-off valves, pressure reducing valves, pressure sensors, etc. in combination, heating devices are known which include those comprising rod heaters and those comprising tape heaters.

In the case where the lateral side of the fluid control apparatus has many projections or indentations when seen from above, it is difficult to install a tape heater along the lateral side of the apparatus, so that rod heaters 44 are used, for example, as shown in FIG. 4. Vertical rod heaters 44 are suitably arranged between a massflow controller 41 and an on-off valve 42, and between the valve 42 and another on-off valve 43. The controller 41 is mounted on a panel 45 and removable upward, and the rod heaters 44 are so arranged as not to interfere with the controller 41 when the controller is removed upward.

The conventional heating device of the rod heater type for use in fluid control apparatus has the problem of producing a difference in heating effect between the portion in contact with the rod heater and the portion out of contact therewith.

SUMMARY OF THE INVENTION

An object of the present invention is to provide a heating device for use in fluid control apparatus which is adapted to uniformly heat the control apparatus even if the lateral side of the apparatus has many projections or indentations when seen from above.

The present invention provides a device for heating a fluid control apparatus including a plurality of fluid controllers arranged in series in a front-to-rear direction and fixed to a panel, the device comprising a tape heater disposed on at least one of opposite lateral sides of the fluid control apparatus, and a plurality of brackets each comprising a bottom wall fastened to the panel with a screw and at least one side wall for holding the tape heater in contact with the fluid controller, the bottom wall of each of the brackets being formed with a screw hole, each of the brackets being attached to the panel and adjustable in position.

The heating device of the invention is so adapted that if the lateral side of the fluid control apparatus has projections or indentations when seen from above, it is possible to position the tape heater alongside the fluid controller and to hold the tape heater in contact with the indented side of the controller by the side wall of the bracket by adjusting the position of the bracket. The controller can therefore be heated uniformly without being influenced by the projection or indentation.

Preferably, a heater level adjusting projection for supporting a bottom face of the tape heater is formed on the bracket side wall at a lower end of a surface thereof in contact with the tape heater. It is then possible to heat the main body of the fluid controller at the midportion of the height thereof.

Preferably, the bracket comprises a rectangular bottom wall elongated in the front-to-rear direction, and a first side wall extending upright from one of lateral side edges of the bottom wall, and the screw hole is a laterally elongated slot. The position of the bracket is then readily adjustable with respect to the lateral direction.

Preferably, the bracket further comprises a second side wall and a third side wall extending upright respectively from front and rear ends of the bottom wall. The tape heater can then be held in contact with surfaces of some of the fluid controllers not only by the first side wall but also by one or both of the second and third side walls.

Preferably, the bracket comprises a square to rectangular bottom wall, and two side walls extending upright from the bottom wall and positioned at a right angle with each other, the screw hole being a slot elongated in the front-to-rear direction. The tape heater can then be held in contact with surfaces of some of the fluid controllers by the two side walls.

BRIEF DESCRIPTION OF THE DRAWINGS

FIG. 3 is a plan view showing another heating device of the invention for use in a fluid control apparatus.

DESCRIPTION OF THE PREFERRED EMBODIMENTS

Embodiments of the invention will be described below with reference to the drawings. In the following description, the terms "front," "rear," "left" and "right" are used based on FIG. 3. The right-hand side and the left-hand side of this drawing will be referred to as the "front" and "rear," respectively, and the terms "left" and "right" are used for the device as it is seen from the rear toward the front.

Figure 1:
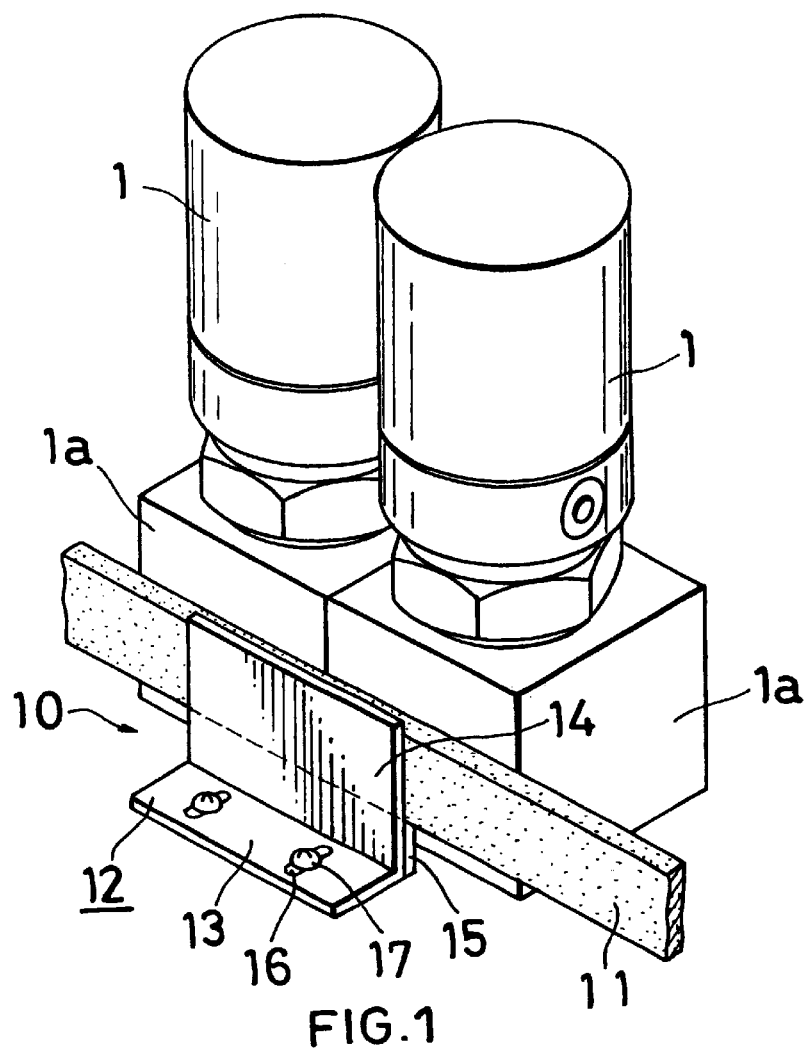
FIG. 1 is a fragmentary perspective view showing a heating device of the invention for use in a fluid control apparatus.

FIG. 1 shows the essential components of a heating device 10 of the invention for use in a fluid control apparatus. With reference to the drawing, the heating device 10 serves to heat fluid controllers 1 which are arranged in series, for example, in the font-to-rear direction. The device 10 comprises tape heaters 11 arranged respectively on the left and right sides (i.e., lateral sides) of the main bodies 1a of the fluid controllers 1 as if holding the bodies therebetween, and brackets 12 for holding the respective tape heaters 11 in contact with the controller main bodies 1a.

Each of the brackets 12 is L-shaped in vertical section and comprises a rectangular bottom wall 13 elongated in the front-to-rear direction, and a side wall 14 extending upright from one of the left and right side edges of the bottom wall 13. The side wall 14 is in contact with the tape heater 11, pressing the heater against the main bodies 1a of the controllers 1. The bottom wall 13 is fastened to a panel with screws 17. The bottom wall 13 is formed with a pair of front and rear slots 16 which are elongated in the left-right direction. The tape heater 11 has a vertical width smaller than the height of the controller main bodies 1a. A heater level adjusting projection 15 for supporting the bottom face of the tape heater 11 is formed on the side wall 14 of the bracket 12 at the lower end of the surface thereof in contact with the heater 11, whereby the tape heater 11 is so positioned as to heat the controller main bodies 1a at the midportion of their height.

Figures 2A, 2B:
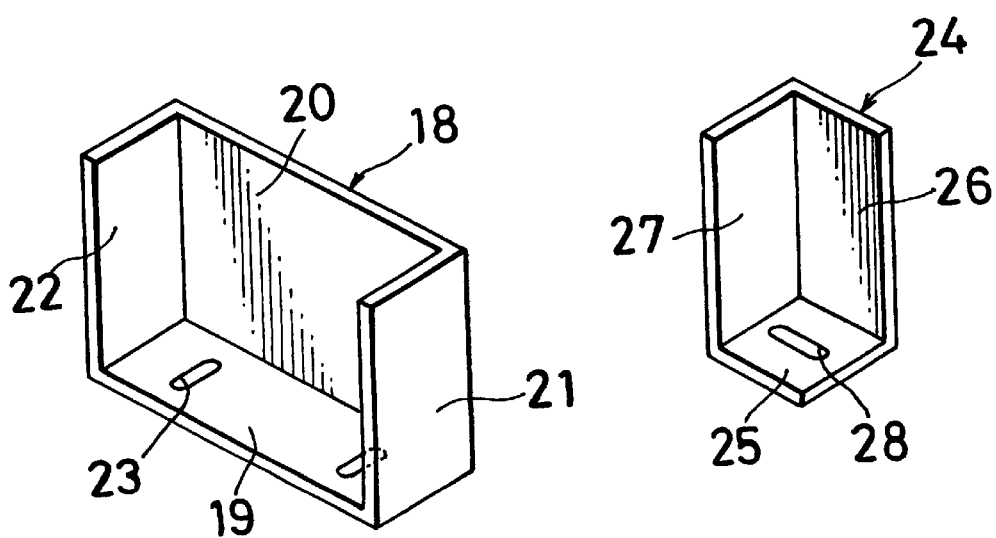
FIGS. 2(a) and 2(b) are perspective views showing modified brackets.
Figure 4:
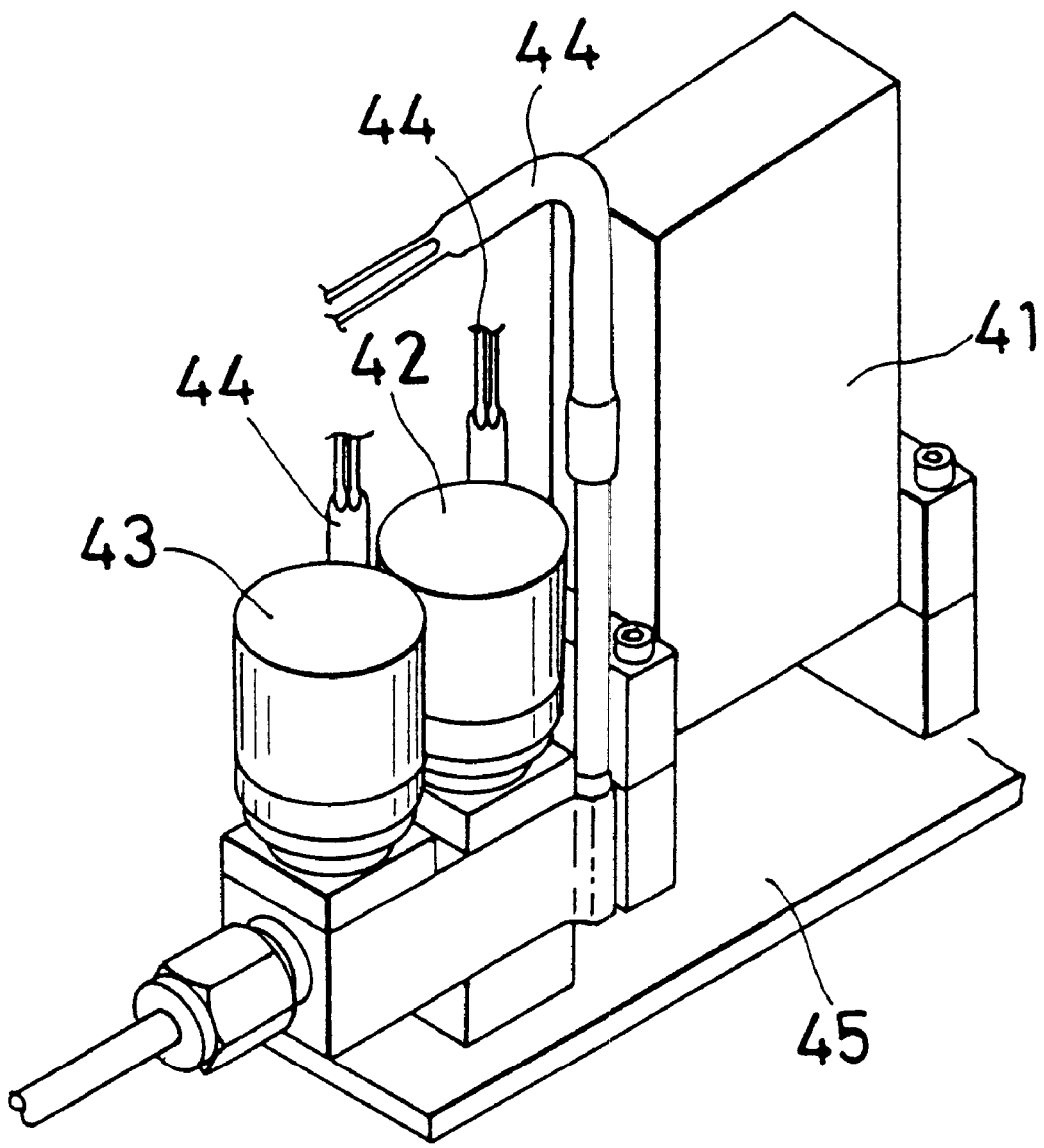
FIG. 4 is a fragmentary perspective view showing a conventional heating device for use in a fluid control apparatus.

FIGS. 2(a) and 2(b) show modified brackets 18, 24, respectively. The bracket 18 of FIG. 2(a) comprises a rectangular bottom wall 19 elongated in the front-to-rear direction, a first side wall 20 extending upright from one of the lateral side edges of the bottom wall 19, and a second side wall 21 and a third side wall 22 extending upright respectively from the front and rear ends of the bottom wall 19. The bottom wall 19 is formed with a pair of front and rear slots 23 which are elongated in the left-right direction. With use of this bracket 18, the tape heater 11 can be held in contact with sides of fluid controllers 2, 3, 4 not only by the first side wall 20 but also by one or both of the second and third side walls 21, 22 as will be described below.

The bracket 24 of FIG. 2(b) comprises a generally square bottom wall 25, and two side walls 26, 27 extending upright from the bottom wall 25 and positioned at a right angle with each other. The bottom wall 25 is formed with a slot 28 elongated in the front-to-rear direction. With use of such brackets 24, the tape heater 11 can be held in contact with sides of fluid controllers 4, 5, 6 as will be described below.

FIG. 3 shows a heating device for use in a fluid control apparatus which device comprises a combination of the three kinds of brackets 12, 18, 24 shown in FIGS. 1, 2(a) and 2(b).

The illustrated fluid control apparatus comprises a right line including a massflow controller 2, first on-off valve 3, second on-off valve 4, third on-off valve 5 and check valve 6 which are arranged from the front rearward in this order, and a left line corresponding to the right line from which the first on-off valve 3 is removed. In the right line, the right sides of the first, second and third on-off valves 3, 4, 5 are recessed from the right side of the massflow controller 2 when seen from above, and the left sides of the first and third on-off valves 4, 5 are recessed from the left side of the second on-off valve 4 when seen from above. In the left line, the right sides of the second and third on-off valves 4, 5 are recessed from the right side of the massflow controller 2 when seen from above, and the left side of the third on-off valve 5 is recessed from the left side of the second on-off valve 4 when seen from above.

For the fluid control apparatus, the bracket 12 of the basic type shown in FIG. 1 is used for holding a tape heater 11 in contact with the right sides of the first and second on-off valves 3, 4 in the right line.

The bracket 18 shown in FIG. 2(a) is used on the left side of the first on-off valve 3 in the right line. The front-to-rear length of the bracket 18 is smaller than the front-to-left length of left side of the first on-off valve 3 by twice the thickness of the tape heater 11. Another tape heater 11 is held in contact with the left side of the first on-off valve 3 by the first side wall 20 of this bracket 18, further in contact with a portion of the rear side of the massflow controller 2 by the third side wall 22, and also in contact with a portion of the front side of the second on-off valve 4 by the second side wall 21.

Two brackets 24 of the type shown in FIG. 2(b) are used for the left side of the third on-off valve 5 in the right line. The front bracket 24 tightly presses the tape heater 11 against part of the rear side of the second on-off valve 4 utilizing the slot 28 which is elongated in the front-rear direction. On the other hand, the rear bracket 24 corresponds to the front bracket 24 as rotated through 90 deg, with the slot 28 thereof extending in the left-right direction. Accordingly, the rear bracket 24 holds the tape heater 11 tightly pressed against the left side of the third on-off valve 5.

The bracket 18 shown in FIG. 2(a) is used for the right side of the second on-off valve 4 in the left line. In this case, a tape heater 11 is held in contact with the right side of the valve 4 by the first side wall 20 and in contact with a portion of rear side of the massflow controller 2 by the second side wall 21, with the third side wall 22 left in a free state.

Another heater is held to the left side of the third on-off valve 5 in the left line in the same manner as on the left side of the third on-off valve 5 in the right line.

In this way, the tape heater can be held in contact not only with the projecting side and recessed side of the fluid controller but also with the front and rear sides defining an indentation, so that the fluid control apparatus can be heated almost uniformly with a high efficiency. The massflow controller 2 mounted on the panel is removable upward, whereas the heating device described will not interfere with the controller 2 when it is removed upward.

All the three types of brackets 12, 18, 24, although used for the control apparatus shown in FIG. 3, need not be used, but, for example, only one of the three types of brackets 12, 18, 24 may be used, or the bracket 12 of the basic type and the bracket 24 of FIG. 2(b) only may be used. Depending on the temperature desired, the tape heater 11 is provided on each or one of the left and right sides of the fluid control apparatus. The screw holes 16, 23, 28 are not limited to slots.

What is claimed is:

1. A fluid control apparatus including a plurality of fluid controllers and a device for heating said fluid controllers, said fluid controller being arranged in series in a front-to-rear direction and fixed to a panel, said heating device, comprising:

a tape heater disposed on at least one of opposite lateral sides of said fluid control apparatus, and;

a plurality of brackets each comprising a bottom wall fastened to said panel with a screw and at least one side wall for holding said tape heater in contact with said fluid controller, wherein said bottom wall of each of said plurality of brackets is provided with a screw hole, each of the brackets being attached to the panel and adjustable in position such that said at least one side wall tightly presses said tape heater against said fluid controller.

2. The fluid control apparatus according to claim 1, further comprising a heater level adjusting projection for supporting a bottom face of said tape heater, said heater level adjusting projection being formed on said bracket side wall at a lower end of a surface thereof in contact with said tape heater.

3. The fluid control apparatus according to claim 1, wherein said bracket comprises a rectangular bottom wall elongated in the front-to-rear direction, and a first side wall extending upright from one of lateral side edges of said bottom wall, and said screw hole is a laterally elongated slot.

4. The fluid control apparatus according to claim 3, wherein said bracket further comprises a second side wall and a third side wall extending upright respectively from front and rear ends of said bottom wall.

5. The fluid control apparatus according to claim 1, wherein said bracket comprises a square bottom wall, and two side walls extending upright from said bottom wall and positioned at a right angle with each other, said screw hole being a slot elongated in the front-to-rear direction.

6. The fluid control apparatus according to claim 1, wherein said screw hole is an elongated slit.

* * * * *